United States Patent [19]

Gottschalk et al.

[11] 4,101,916
[45] Jul. 18, 1978

[54] ILLUMINATED GROUND GLASS FOR CAMERA

[75] Inventors: Robert E. Gottschalk, Los Angeles; Albert L. Mayer, Tarzana, both of Calif.

[73] Assignee: Panavision, Incorporated, Tarzana, Calif.

[21] Appl. No.: 711,062

[22] Filed: Aug. 2, 1976

[51] Int. Cl.² ..................... G03B 13/02; G03B 19/12
[52] U.S. Cl. ..................................... 354/219; 354/155
[58] Field of Search .............. 354/151, 152, 155, 200, 354/201, 219, 154, 221, 222, 224; 352/171

[56] References Cited

U.S. PATENT DOCUMENTS

| 1,140,108 | 5/1915 | Brown | 354/219 |
|---|---|---|---|
| 1,897,268 | 2/1933 | Merle | 354/222 |
| 2,105,557 | 1/1938 | Slack | 354/155 |
| 3,100,430 | 8/1963 | Morelle | 354/155 |
| 3,357,328 | 12/1967 | Kinder et al. | 354/222 |
| 3,393,623 | 7/1968 | Gutmann et al. | 354/219 X |
| 3,765,754 | 10/1973 | Winkler | 354/219 X |

FOREIGN PATENT DOCUMENTS 1,277,121 10/1961 France ................... 354/152

Primary Examiner—Donald A. Griffin
Attorney, Agent, or Firm—Lyon & Lyon

[57] ABSTRACT

To facilitate viewing of scenes photographed by a motion picture camera under dim lighting conditions, a viewing system for aiming and focusing the motion picture camera incorporates a ground glass plate and a beam splitter with the light from a scene photographed being, in turn, reflected from a conventional rotating camera shutter, through the ground glass plate and then reflected from one side of a beam splitter and then through an optical system to an eyepiece. A solid state lamp such as red light emitting diodes are disposed on the other side of the beam splitter with the red light being transmitted through the beam splitter onto the ground glass plate which has a set of lines defined by metal strips from which the red light is reflected back onto the beam splitter and to the eyepiece, such set of lines defining the boundary within which the scenes are required to be located.

7 Claims, 2 Drawing Figures

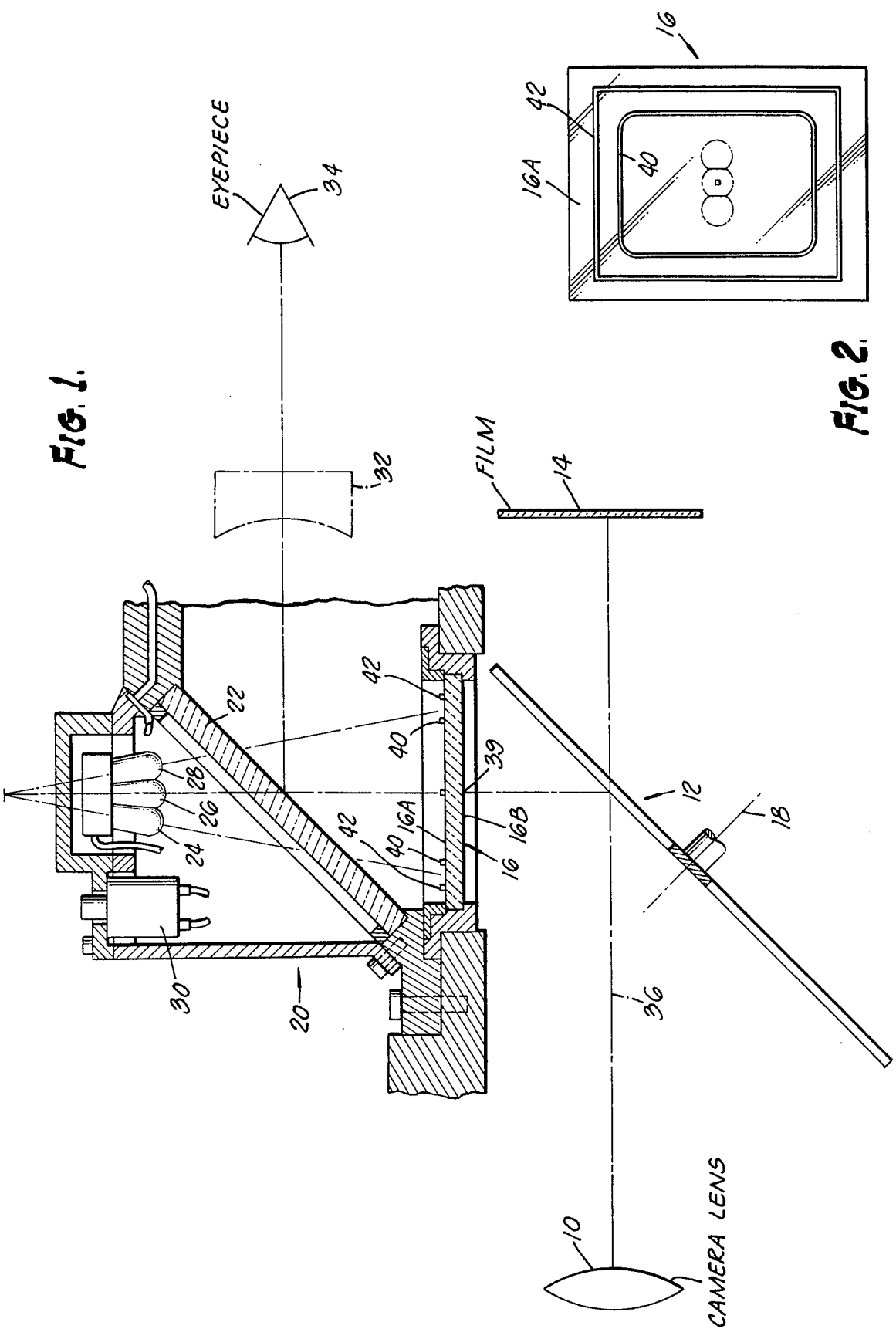

ILLUMINATED GROUND GLASS FOR CAMERA

The present invention relates to improvements in viewing systems for motion picture cameras.

Heretofore, difficulties have been encountered in orienting or aiming a motion picture camera when the ambient light is dim as, for example, when it is desired to shoot night scenes. In such cases, using prior art systems, while there are lines in the optical system useful in outlining the boundaries in the field of view under relatively bright light conditions, such lines disappear under dim lighting conditions.

An object of the present invention is to provide an improved viewing system in which a set of lines defining the boundaries of the field of view for motion pictures is well defined both under relatively bright and also dim lighting conditions as, for example, when night scenes are being photographed.

A specific object of the present invention is to provide an improved system using an illuminated ground glass plate with metal light reflecting elements thereon and associated optics.

Another specific object of the present invention is to provide an improved viewing system using a ground glass plate on which light reflecting material is disposed for defining the boundaries of the field of view, and such plate being illuminated by red light transmitted through a beam splitter, the beam splitter normally functioning to reflect light from the scene onto an eyepiece, and also to transmit the red light and reflect the same to the same eyepiece.

In the drawings;

FIG. 1 illustrates the optical viewing system partly in structural and partly in diagrammatic form.

FIG. 2 illustrates structural features of the ground glass viewing plate in relation to the three lamps used to illuminate it.

The motion picture camera includes a conventional camera lens 10, a conventional rotating shutter 12 which is synchronized with the movement of the motion picture film 14, an image of the scene to be photographed being alternately projected onto the film 14 and reflected by such shutter onto a special ground glass plate 16 when and as such shutter 12 rotates about the axis 18.

The ground glass plate 16 is suitably mounted in the multi-piece viewer housing 20 in which is also mounted a so called half silvered mirror or beam splitter 22, three solid state lamps 24, 26, 28 and manually operable electrical switch 30 for switching such lamp on under dim light conditions. The image reflected from the beam splitter 22 may be viewed using lens 32 and eyepiece 34.

It will be observed that the planes of the light reflecting elements of shutter 12 are at an angle with respect to the optical axis 36 and that the plane of the beam splitter 22 is inclined at an angle with respect to the reflected principal axis.

The plate 16, on the one hand, and the lights 24, 26, 28, on the other hand, are on opposite sides of the beam splitter 22 with the light produced by such lamps 24, 26, 28 being transmitted through the beam splitter 22 to illuminate the back surface 16A of the special ground glass plate 16.

Only the front face 16B of plate 16 need be ground.

The back face 16A is flat and is provided with boundary lines thereon which define two generally rectangular patterns 40, 42. The lines defining such patterns may be formed thereon using different methods. For example, the surface 16A may be grooved to correspond to the desired patterns and the grooves thus formed may be filled with a metal which reflects light produced by the solid state lamps or light emitting diodes 24, 26, 28, or light reflecting metal may be affixed directly onto surface 16A without initially grooving such surface. Red color light is preferable. Crosshairs 39 are provided on the front face 16B for purposes of focusing. A small metal projection is provided on the flat surface 16B to define the center of each of the patterns formed by the boundaries 40, 42.

The red light source may comprise one or more individual lamps for producing the desired illumination and such lights may be three in number placed as indicated in FIG. 2 when the camera lens 10 is an anamorphic lens and in such case such lights may have their projection axes inclined relative to each other at an angle of approximately 10°.

The outer set of lines define the boundary of the field of view 42 for conventional motion pictures to be used in theatres whereas the inner set of lines define the boundary of view 40 for motion pictures to be used in Television.

Thus, when the camera is being used in night scenes and the solid state lamps are lit, the lines defining the boundaries 40, 42 appear visible at the eyepiece 34 and the operator need not guess as to whether the camera is aimed and focused to obtain all of the desired view. The red light from the red light emitting diodes is reflected from both sets of lines and appear visible for nighttime use.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a viewing system for cameras, a plate having one side thereof provided with a matte viewing surface comparable to a ground glass surface onto which images of scenes are projected for viewing, the other side of said plate having a set of lines of light reflecting material with said set of lines defining boundary limits of such scenes, a beam splitter, an eyepiece system, said beam splitter reflecting said projected light from said plate onto said eyepiece system, a lamp system projecting light through said beam splitter onto said light reflecting material with the light reflected therefrom being reflected back onto said beam splitter which reflects said reflected light onto said eyepiece system.

2. A system as set forth in claim 1 in which said lamp produces light which is predominately red in color.

3. A system as set forth in claim 2 in which said lamp includes a light emitting diode.

4. A viewing system as set forth in claim 1 in which said camera is a motion picture camera and a movable shutter on said camera alternately allowing transmission of light onto photographic motion picture film and reflecting light onto said viewing surface.

5. In a viewing system for cameras, a light transmitting plate having one side thereof formed with a matte surface comparable to a ground glass surface, light reflecting material fixed on the other side of said plate and positioned inwardly from the edges thereof so as to define boundary limits of a scene to be photographed.

6. A system as set forth in claim 5 including lamp means for illuminating said light reflecting material.

7. In a viewing system for cameras, a light transmitting plate having one side thereof formed with a matte surface comparable to a ground glass surface, light reflecting material fixed on the other side of said plate and defining boundary limits of a scene to be photographed, lamp means for illuminating said light reflecting material, and a light beam splitter between said lamp means and said light reflecting material, with said beam splitter functioning to transmit light from said lamp means onto said light reflecting material and subsequently reflect said light reflected from said material.

* * * * *